US006553159B1

(12) United States Patent
Raiti

(10) Patent No.: US 6,553,159 B1
(45) Date of Patent: Apr. 22, 2003

(54) METHOD AND SYSTEM FOR CONTROLLING THE OUTPUT OF AN OPTICAL PUMP ENERGY SOURCE

(75) Inventor: Peter A. Raiti, Fort Washington, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/003,766

(22) Filed: Oct. 29, 2001

(51) Int. Cl.[7] .............................. G02B 6/26; G02B 6/42; H04B 10/12
(52) U.S. Cl. ................... 385/15; 372/6; 359/341.1; 359/341.3; 359/341.4; 359/341.41; 359/341.42; 359/341.33; 359/341.44
(58) Field of Search .................... 385/15, 24, 27; 372/6; 359/341.1, 341.3, 341.4, 341.41, 341.42

(56) References Cited

U.S. PATENT DOCUMENTS

| | | | | |
|---|---|---|---|---|
| 5,239,607 A | * | 8/1993 | da Silva et al. | 359/337.12 |
| 5,710,660 A | * | 1/1998 | Yamamoto et al. | 359/341.44 |
| 6,055,092 A | * | 4/2000 | Sugaya et al. | 359/134 |
| 6,064,515 A | * | 5/2000 | Yang | 359/341.33 |
| 6,104,526 A | * | 8/2000 | Kakui | 359/161 |
| 6,229,936 B1 | * | 5/2001 | Kosaka et al. | 385/24 |
| 6,356,385 B1 | * | 3/2002 | Digonnet et al. | 359/337 |
| 6,373,623 B1 | * | 4/2002 | Ohshima et al. | 359/341.3 |

OTHER PUBLICATIONS

Taga, Hidenori et al., "5 Gbit/s, 233 km Optical Fiber Transmission Experiment Employing Five Semiconductor Laser Amplifiers," IEEE Photonics Technology Letters, vol. 1, No. 10, pp. 332–333, Oct., 1989.

Salisbury, Michael S. et al., "Sensitivity Improvement of a 1–$\mu m$ Ladar System Incorporating an Optical Fiber Preamplifier," Optical Engineering, vol. 32, No. 11, pp. 2671–2680, Nov., 1993.

Li, Tingye, "The Impact of Optical Amplifiers on Long–Distance Lightwave Telecommunications," Proceedings of the IEEE, vol. 81, No. 11, pp. 1568–1579, Nov., 1993.

Lawetz, Chris et al., "Performance of Optically Preamplified Receivers With Fabry–Perot Optical Filters," IEEE Journal of Lightwave Technology, vol. 14, No. 11, pp. 2467–2474, Nov., 1996.

Song, Dong–Yiel et al., "4×10 Gb/s Terrestrial Optical Free Space Transmission Over 1.2 km Using an EDFA Preamplifier With 100 GHz Channel Spacing," Optics Express, vol. 7, No. 8, pp. 280–284, Oct., 2000.

(List continued on next page.)

*Primary Examiner*—John D. Lee
*Assistant Examiner*—Daniel Valencia
(74) *Attorney, Agent, or Firm*—Akin, Gump, Strauss, Hauer & Feld, L.L.P

(57) ABSTRACT

The amplification and noise level of an optical communication signal is controlled by providing a feedback loop to adjust the energy level of an optical pump energy source used to amplify the communication signal. The communication signal is combined with an optical control signal outputted by the pump energy source. The communication signal is amplified as the combined signals pass through an erbium doped fiber optic cable energized by the control signal. The amplified communication signal is then separated from the control signal. The control signal is in a depleted state (substantially residual pump energy) after traveling through the length of the erbium doped fiber optic cable. A feedback signal, used to adjust the energy level of the control signal, is generated based on the amplified communication signal and the depleted control signal.

27 Claims, 3 Drawing Sheets

OTHER PUBLICATIONS

Feng, Helena X. C. et al., "Effects of Optical Layer Impairments on 2.5 Gb/s Optical CDMA Transmission," Optics Express, vol. 7, No. 1, pp. 2–9, Jul., 2000.

Alcatel website, "Alcatel Optronics Compact Amplifier Line Covers Wider Range of DWDM Applications," printout from web site address: http://www.alcatel.com/telecom/optronics/press/1906–07ofa.htm, printout date: May 29, 2001 (3 pages).

Press Release, "Alcatel Optronics Introduces New DWDM Products at InterOpto in Chiba, Japan," printout from web site address: http://www.compoundsemiconductor.net/PressReleases/2000/PR07110001.htm, printout date: May 29, 2001 (3 pages).

Alcatel website, "Alcatel Optronics Unveils the Most Advanced High Bit–rate Optical Pre–Amplifier Available on the Market," printout from web site address: http://www.alcatel.com/telecom/optronics/press/1907.htm, printout date: May 29, 2001 (3 pages).

Alcatel Data Sheet, "Alcatel 1916 SDH, SDH/SONET Integrated Modules, Receiver STM–16/OC–48 With Preamplifier EDFA," Nov., 2000 (4 pages).

Ditech website, "EDFA Optical Amplifiers—1550 nm.," printout from web site address: http://www.rdtelcom.com.br/i_inrddtch01.html, printout date: May 29, 2001 (3 pages).

Ditech Communications Data Sheet, "Optical Amplifiers," undated (2 pages).

* cited by examiner

*- PRIOR ART -*

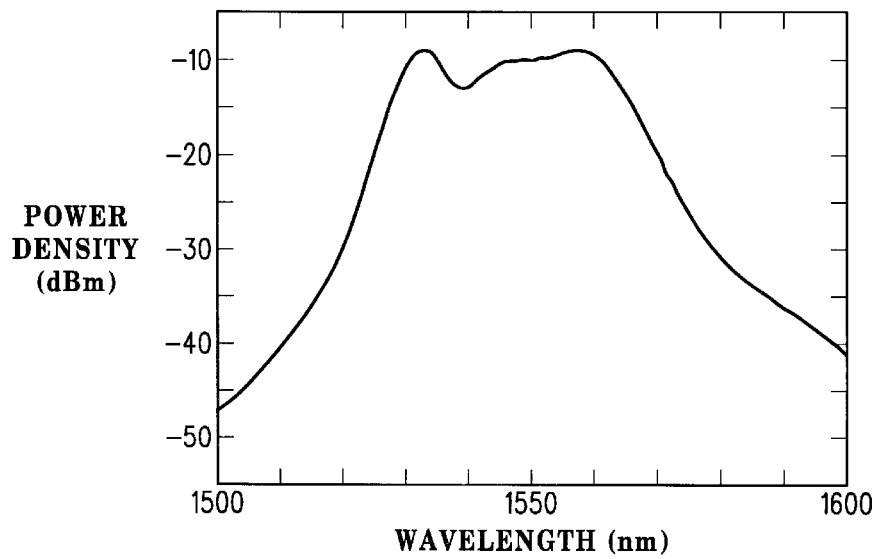
*- PRIOR ART -* FIG. 2
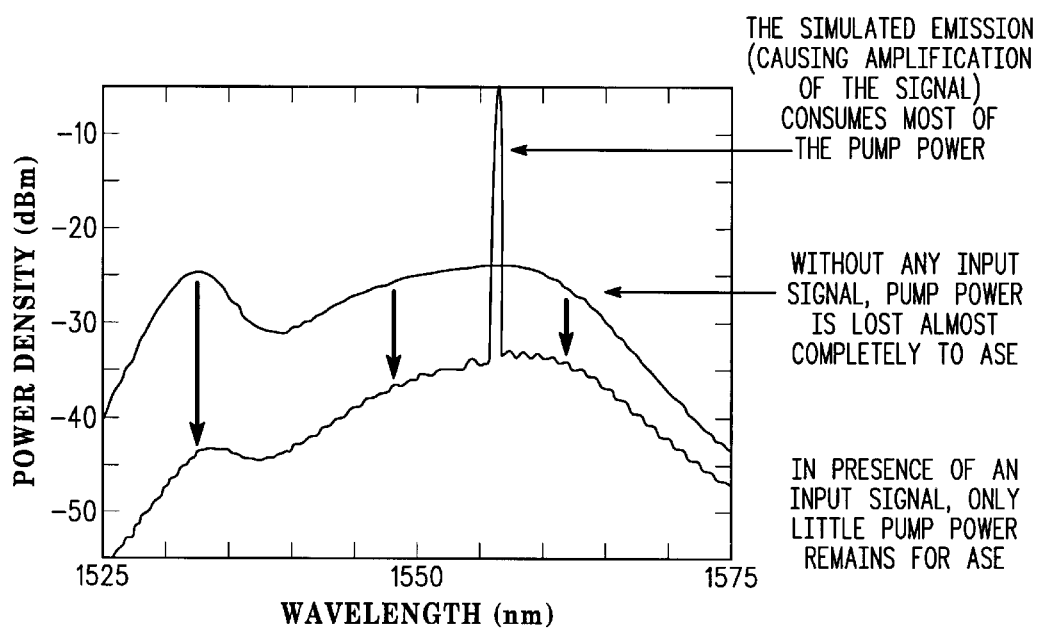
*- PRIOR ART -* FIG. 3

METHOD AND SYSTEM FOR CONTROLLING THE OUTPUT OF AN OPTICAL PUMP ENERGY SOURCE

BACKGROUND OF THE INVENTION

Field of the Invention

The present invention generally relates to the field of electro-optics and more specifically to controlling the amplification of an optical communication signal.

BACKGROUND INFORMATION

In any communication system, ultimate reception of a given transmitted signal is governed by the overall signal-to-noise ratio (SNR) of the receiving system. The larger the SNR, the more reliable the signal detection process. A weak signal captured by a detector must compete with various internal noise sources produced by associated electronic and optical systems. External and background noise sources, typically encountered in free space communication links, provide additional noise components and are not a concern in closed fiber networks. Detection of the signal is accomplished when the signal level rises above the statistical summation of all contributory noise sources.

Much of the investigative work involving erbium preamplifiers has been targeted to laser radar and free space communication systems where issues of low signal levels, due to poor target reflectivity and inefficient signal coupling into receiver optics, are of paramount importance. The application of erbium preamplifiers to fiber optic systems would readily enhance weak signal detection.

FIG. 1 shows a typical optical receiver system 100 which includes a photo detector 105 whose electrical output is coupled to a transimpedance amplifier (TIA) 110. The TIA serves to convert the photo detector signal current into an amplified voltage suitable for signal processing. The overall SNR of the receiver system 100 is statistically determined by the noise contributed by both the photo detector 105 and the TIA 110. If the photo detector 105 is a positive-intrinsic-negative (PIN) photodiode, with a gain M of 1, both the TIA 110 and photo detector 105 will contribute to the overall receiver system noise figure. If the photo detector 105 is an APD (avalanche photo detector) photodiode, with a gain M of 10 to 20, the noise contributed by the TIA 110 will not prove as critical. The noise factor of a receiver system employing an APD detector may be described as follows:

$$F_{total} = F_{apd} + [(F_{tia} - 1) * (M_{apd})^{-1}]$$

where,

- $F_{total}$ is the total noise factor of the combined photo detector 105 and TIA 110
- $F_{apd}$ is the noise factor of the APD photodiode (typical value of 5 or 6)
- $M_{apd}$ is the gain of the photodiode, M=1 for a PIN and M=10 to 20 for an APD
- $T_{tia}$ is the noise factor of the TIA 110.

The high gain provided by the first stage, in this case an APD photodiode ($M_{apd}$), reduces the effect of noise contributed by the TIA 110. The key is to identify a first stage component device that provides high gain while contributing low noise.

The improving technology in erbium fiber amplifier technology has produced amplifier systems with relatively low 4 to 5 dB noise figures. Translated into a noise factor, the equation converts a 5 dB noise figure, $$\text{Noise Figure} = 10 \text{ Log } [\text{Noise Factor } (F_{erbium-amp})]$$

into a noise factor of approximately 3.16 which is better than a typical noise factor of 5 or 6 for a standalone APD detector. Additionally the erbium amplifier will provide power gains of 20 dB (Gain of 100) to 30 dB (Gain of 1000) with relatively modest pump power. The overall gain of the amplifier can be scaled either with a variation of fiber length or adjustment of pump power. It is this characteristic of high gain with relatively low noise factor that justifies the possible utilization of an erbium fiber system as a photodiode optical preamplifier stage.

The primary noise source in erbium receiver systems is amplified spontaneous emission (ASE) noise produced by the interaction of the pump energy source with the erbium doped fiber optic cable used in the system. FIG. 2 (from Hewlett Packard's 1999 Lightwave Test and Measurement Catalog) shows that ASE noise is generally specified as a quantity of spectral noise power over a given optical bandwidth. The spectral noise power is distributed across the entire operational optical bandwidth of the erbium amplifier and can span a continuous wavelength region, which in this case is from 1500 nm to 1600 nm. A photo detector has a broad optical bandwidth response and will detect the ASE noise power across this entire band. Since an optical signal is centered at a particular wavelength, an optical transmission filter is utilized to block out the majority of the ASE power outside of the signal bandwidth. A detector following the filter will then be sensitive only to optical energy of wavelengths centered over the filter pass-band. The filter operational band-pass is chosen to accommodate the spectral content of the signal.

Conventional wavelength division multiplexing (WDM) systems efficiently use bandwidth in existing fiber-optic telecommunication infrastructures. WDM systems employ coupler technology with very narrow bandwidth transmission characteristics. This characteristic is utilized to select or insert signals at various wavelengths into the fiber optic transmission path. WDM couplers are naturally suited to erbium amplifier systems since the inherent narrow passband characteristic of these couplers automatically filters out the ASE noise power produced by an erbium amplifying medium and intercepted by a photo detector. Additionally, as shown in FIG. 3 (from Hewlett Packard's 1999 Lightwave Test and Measurement Catalog), the overall ASE noise power is reduced as optical signals are amplified.

The overall gain of an amplification system will be the gain product of the individual components. Since an APD provides a gain of 10 to 20, the corresponding gain required from the erbium preamplifier can be reduced. For a given length of erbium fiber, gain reduction is obtained by adjusting the level of pump power. Reducing pump power will also reduce the amount of ASE noise. An operational configuration of an erbium amplifier with 10 dB of gain coupled to an APD with a gain of 10 will provide an overall system gain of 100 with noise levels below that obtained from a single APD, operating near its avalanching region, in an attempt to achieve a similar gain of 100. The overall system noise factor will therefore be $$F_{total} = F_{erbium} + [(F_{apd} - 1) (G_{ain-erbium})^{-1}]$$

The very high gain obtained from the erbium preamplifier will reduce the noise contributed by the APD photo detector. System issues will dictate the selection of component gain. A TIA following the ADP photo detector may not be required except to satisfy signal translation or interface issues.

SUMMARY OF THE INVENTION

The present invention insures that a control signal used to amplify a received optical signal has a sufficient output power level. Further, the present invention automatically optimizes system performance by maintaining a constant gain setting and adjusting the pump level for optimum pump depletion with a minimum production of ASE noise. The present invention improves the overall qualities of the amplified signal, such as broadband gain, pulse response, linearity and distortion characteristics. An optically pre-amplified detector component is incorporated in a receiver to provide long distance, high bandwidth, forward path link and distribution services. The present invention includes an enhanced optical erbium fiber amplifier used to pre-amplify an optical signal that is subsequently presented to an avalanche or PIN photodiode detector.

The present invention is an optical system that includes a first optical detector, a second optical detector, and an optical pump energy source which outputs an optical control signal at a particular output energy level. When an optical communication signal is received into the optical system, the communication signal is amplified using the optical control signal. The amplified communication signal is inputted into the first detector, the control signal is inputted into the second detector, and the energy level of the control signal is controlled based on signals outputted by the first and second detectors.

The optical communication signal may be amplified by combining the communication signal with the control signal, routing the combined signals through an erbium doped fiber optic cable, and separating the combined signals.

The optical communication signal may be amplified by the control signal energizing the erbium doped fiber optic cable. The control signal inputted into the second detector may be substantially residual pump energy which originated from the optical source and was separated from the combined signals.

In one embodiment of the present invention, a feedback signal, derived from the signals outputted by the first and second detectors, may be transmitted to control an optical device that determines the energy level of the control signal. The optical device may be an electronically controlled optical attenuator optically coupled to an output of the optical source through which the control signal is outputted.

In another embodiment of the present invention, a feedback signal, derived from the signals outputted by the first and second detectors, may be transmitted to control a drive current of the optical pump energy source that determines the output energy level of the optical control signal.

The communication signal may have a first wavelength and the control signal may have a second wavelength. The first wavelength may be about 1550 nm and the second wavelength may be about 980 nm.

The optical system may be an erbium doped fiber amplifier (EDFA) system. ASE noise on the amplified communication signal may be filtered out prior to being inputted into the first detector.

In yet another embodiment of the present invention, the optical system includes a system input, an optical pump energy source, and a first and second optical detector. The system input receives an optical communication signal. The optical pump energy source outputs an optical control signal at a particular output energy level. The communication signal is amplified using the optical control signal. The amplified communication signal is inputted into the first detector. The control signal is inputted into the second detector. Signals outputted by the first and second detectors are used to control the energy level of the control signal.

The optical system may also include an input optical coupler, an output optical coupler, and an erbium doped fiber optic cable. The input optical coupler combines the communication signal with the control signal. The output optical coupler separates the combined signals. The erbium doped fiber optic cable optically couples the input and output couplers. The communication signal may be amplified by the control signal energizing the erbium doped fiber optic cable.

The optical system may also include an ASE noise filter, optically coupled between the output coupler and the first detector, that filters out the ASE noise on the communication signal prior to being inputted into the first detector.

The input and output couplers may be dichroic couplers. The control signal inputted into the second detector may be substantially residual pump energy which originated from the optical source and was separated from the combined signals.

In yet another embodiment, the optical system may also include variable attenuator circuit. The signals outputted by the first and second detectors may be used by the variable attenuator circuit to control the energy level of the control signal. The variable attenuator circuit may include an electronically controlled optical attenuator optically coupled to an output of the optical source through which the control signal is outputted. A feedback signal, derived from the signals outputted by the first and second detectors, may be transmitted to the optical attenuator to control the energy level of the control signal.

The first detector may be either a PIN photodiode or an avalanche photodiode (ADP). The second detector may be a photodiode. The optical source may be a pump laser source.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings:

FIG. 2 shows the ASE noise spectrum of a prior art erbium fiber amplifier;

FIG. 3 shows the reduction of ASE noise power as input signals are amplified in a prior art erbium fiber amplifier;

DETAILED DESCRIPTION OF THE INVENTION

Figure 1:
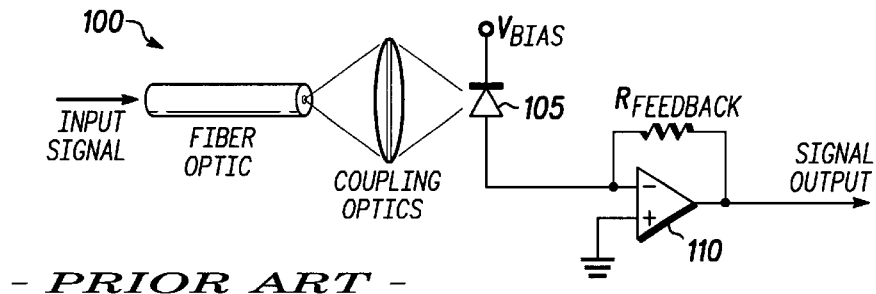
FIG. 1 shows a prior art optical receiver system.
Figure 4:
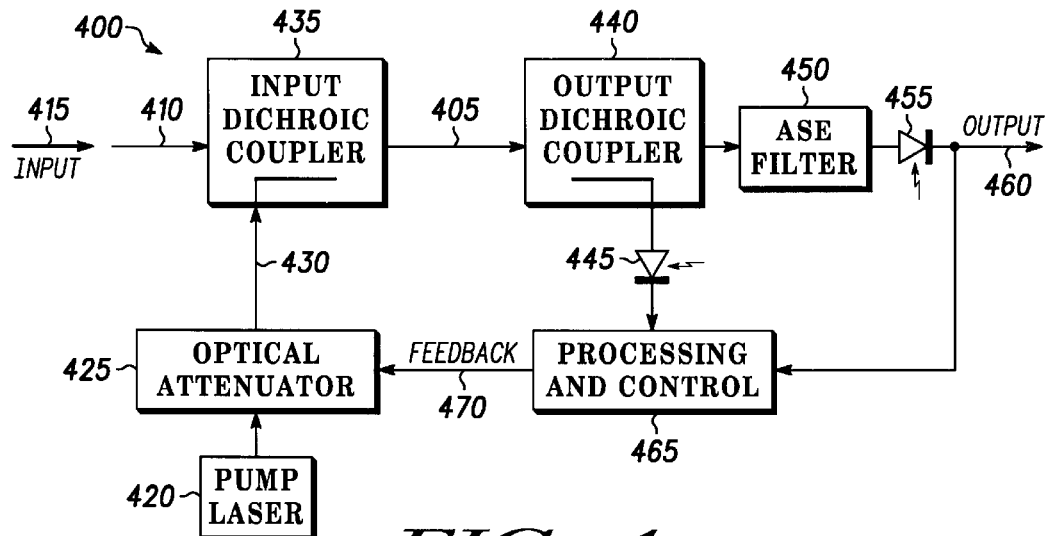
FIG. 4 shows a schematic diagram of an enhanced erbium fiber amplifier system using an electronically controlled optical attenuator in accordance with the present invention.

As shown in FIG. 4, the present invention is an optical system 400 that employs an erbium doped fiber optic cable 405, typically 5 to 10 meters in length, as an amplifying element. Optical system 400 may be an erbium doped fiber amplifier (EDFA) system.

At input 410 of optical system 400, an optical communication signal 415 (e.g., having a wavelength of about 1550 nm) is received. Optical system 400 includes an optical pump energy source 420 (e.g., laser diode source) and an electronically controlled optical attenuator 425 which output an optical control signal 430 (e.g., having a wavelength of about 980 nm) at a particular output energy level. The electronically controlled optical attenuator 425 may be separate from the optical pump energy source 420 or be a component within the optical pump energy source 420. In either case, the energy level of optical control signal 430 is variably controlled. Optical system 400 also includes an input dichroic optical coupler 435 (e.g., having wavelengths of 1550 nm and 980 nm) which combines the communication signal 415 and the control signal 430. The combined signals are routed from the input dichroic optical coupler 435 through the erbium fiber optic cable 405. The erbium fiber optic cable 405 which is employed as an amplifying element. The erbium fiber optic cable 405 is energized or "pumped" by the optical control signal 430.

At the output of the erbium fiber optic cable 405 is an output dichroic optical coupler 440 which receives the combined signals and separates the amplified communication signal from the control signal 430. The control signal 430 is routed from a coupled port of output dichroic optical coupler 440 to a monitoring detector 445, which may be a photodiode. The amplified communication signal is routed from the main-line output port of the output dichroic optical coupler 440 through an ASE filter 450 to a receiving detector 455 which outputs an amplified output signal 460 from the optical system 400. The receiving detector 455 may be an avalanche photodiode (ADP) or a positive-intrinsic-negative (PIN) photodiode. An ADP would be a more appropriate detection component for digital applications. The amplified output signal 460 and an output signal from the monitoring detector 445 are analyzed by a signal processing and control circuit 465 which, based on the analysis, provides a feedback signal 470 to electronically controlled optical attenuator 425 to control the energy level of optical control signal 430.

The interaction of the optical control signal 430 within the erbium fiber optic cable 405 will produce a high level of ASE noise. The ASE noise has an optical spectral energy content (e.g., 1500 nm to 1600 nm). Since a photo detector cannot differentiate between optical spectral components, it will detect all of the energy content available within the bandwidth of the ASE noise. This detection process appears as electrical noise to post processing functions. The level of ASE energy available for detection, at a particular wavelength, is mitigated by the bandwidth of the ASE filter 450 incorporated prior to the receiving detector 455. The wavelength of the ASE filter 450 is centered about the optical carrier signal wavelength and is considerably wider than the modulation signal bandwidth imposed on the lightwave carrier. When an input signal is present (lightwave carrier plus modulation signal), the ASE energy is channeled into the signal, producing an amplified output with a relatively low level of residual ASE noise. If a signal is not present, ASE energy within the pass band of the ASE filter 450 will be detected and interpreted as noise. The present invention maintains a constant signal level thorough the amplifier chain, thereby converting ASE energy into signal, and minimizing ASE noise.

The output dichroic optical coupler 440 is utilized to remove the non-depleted pump energy through the coupled port of output dichroic optical coupler 440 while allowing the amplified signal to reach the output of optical system 400 without being attenuated. The non-depleted pump energy is that portion of the pump excitation that was not converted to ASE energy or depleted through other material loss processes within the erbium fiber optic cable 405. The coupled port of the output dichroic optical coupler 440 has a narrow band pass characteristic centered at the pump wavelength. The amplification process is brought about by the extraction and channeling of ASE energy into the signal. Sampling the residual, non-depleted pump energy level using monitoring detector 445 provides an indication of the efficiency of the amplification process as well as a feedback mechanism for precise control of the pump energy. The amount of pump energy required is governed by the optical losses in the fiber and the overall signal gain. Ideally, one would like to have all of the ASE energy converted to signal energy, a condition that is generally not achievable. Maximum gain with minimum ASE noise can be achieved with judicious active control of the pump energy level. Maintaining the pump energy at an optimum level for a desired gain setting minimizes excess ASE noise and improves system performance. Additionally, pumping the system with more energy than is necessary is not cost effective and compromises the reliability of the pump laser.

The function of the signal processing and control circuit 465 is to acquire and process information about the amplified output signal 460 and the level of pump depletion. This information is utilized in an algorithmic process to automatically optimize system performance by maintaining a constant gain setting and adjusting the pump level for optimum pump depletion with a minimum production of ASE noise. The signal processing and control circuit 465 samples a portion of the amplified output signal 460. The sampling function serves as an independent indicator of the level of amplified signal. The amplified signal contains both a lightwave and a modulation signal component. The sampled signal, coupled with information about the level of depleted pump energy, serves as a feedback mechanism to maintain the signal at a constant level with minimal noise.

Figure 5:
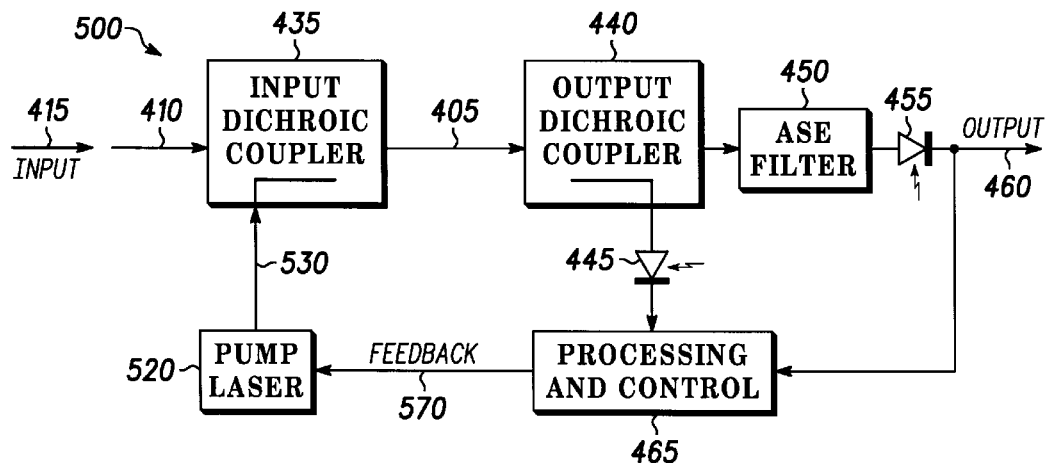
FIG. 5 shows a schematic diagram of an enhanced erbium fiber amplifier system using a feedback signal to control the drive current of a laser pump in accordance with the present invention.

As shown in FIG. 5, a slightly different embodiment of the present invention is practiced in an optical system 500. The amplified output signal 460 and an output signal from the monitoring detector 445 are analyzed by a signal processing and control circuit 465 which, based on the analysis, provides a feedback signal 570 directly to the optical pump energy source 520 to control a drive current that determines the output energy level of optical control signal 530. Thus, the use of a separate variable attenuator to control the output energy level of optical control signal 530 is not required.

Figure 6:
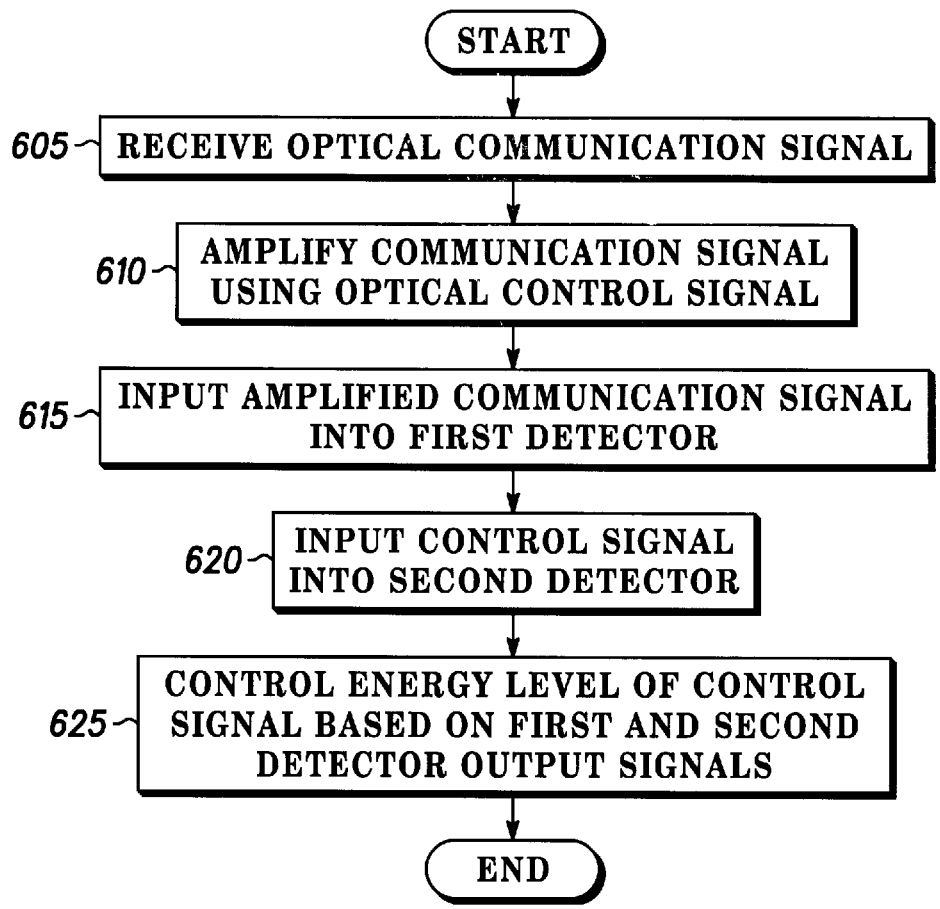
FIG. 6 shows a flow chart diagram illustrating how a received signal is processed in accordance with the present invention.

Referring now to FIGS. 4 and 6, a method is now described in accordance with the present invention. When an optical communication signal 415 is received (step 605), the communication signal 415 is amplified using an optical control signal 430 (step 610). The amplified communication signal is inputted into a first detector (receiving detector 455) (step 615). The control signal is inputted into a second detector (monitoring detector 445) (step 620). The energy level of the control signal is then controlled (using feedback signal 470) based on signals outputted from the first and second detectors (step 625).

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products)

having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. In an optical system comprising a system input, a system output, a first optical detector, a second optical detector, and an optical pump energy source which outputs an optical control signal at a particular amplitude, a method comprising:
   (a) receiving an optical communication signal at the system input;
   (b) amplifying the communication signal using the control signal;
   (c) filtering out noise from the amplified communication signal;
   (d) inputting the filtered communication signal into the first detector;
   (e) inputting the control signal into the second detector; and
   (f) controlling the amplitude of the control signal based on signals outputted by the first and second detectors, wherein the first detector outputs a signal with minimal noise to the system output.

2. The method of claim 1, wherein step (b) comprises:
   (i) combining the communication signal with the control signal;
   (ii) routing the combined signals through an erbium doped fiber optic cable; and
   (iii) separating the combined signals.

3. The method of claim 2, wherein the communication signal is amplified by the control signal energizing the erbium doped fiber optic cable.

4. The method of claim 3, wherein the control signal inputted into the second detector is substantially residual pump energy which originated from the optical pump energy source and was separated from the combined signals.

5. The method of claim 1, wherein step (f) comprises transmitting a feedback signal, derived from the signals outputted by the first and second detectors, to control an optical device that determines the amplitude of the control signal.

6. The method of claim 5, wherein the optical device is an electronically controlled optical attenuator optically coupled to an output of the optical pump energy source through which the control signal is outputted.

7. The method of claim 1, wherein the communication signal has a first wavelength and the control signal has a second wavelength.

8. The method of claim 7, wherein the first wavelength is about 1550 nm and the second wavelength is about 980 nm.

9. The method of claim 1, wherein step (f) comprises transmitting a feedback signal, derived from the signals outputted by the first and second detectors, to control a drive current of the optical pump energy source that determines the amplitude of the control signal.

10. The method of claim 1, wherein the optical system is an erbium doped fiber amplifier (EDFA) system.

11. The method of claim 1, wherein the noise primarily includes amplified spontaneous emission (ASE) noise.

12. An optical system, comprising:
   (a) a system input which receives an optical communication signal;
   (b) a system output;
   (c) an optical pump energy source which outputs an optical control signal at a particular amplitude;
   (d) a noise filter; and
   (e) a first and second optical detector, wherein:
      (i) the communication signal is amplified using the control signal;
      (ii) noise is filtered out from the amplified communication signal by the noise filter;
      (iii) the filtered communication signal is inputted into the first detector;
      (iv) the control signal is inputted into the second detector; and
      (v) signals outputted by the first and second detectors are used to control the amplitude of the control signal, wherein the first detector outputs a signal with minimal noise to the system output.

13. The system of claim 12, further comprising:
   (f) an input optical coupler which combines the communication signal with the control signal;
   (g) an output optical coupler which separates the combined signals; and
   (h) an erbium doped fiber optic cable which optically couples the input and output couplers, wherein the filter is optically coupled between the output coupler and the first detector.

14. The system of claim 13, wherein the communication signal is amplified by the control signal energizing the erbium doped fiber optic cable.

15. The system of claim 12, wherein the noise primarily includes amplified spontaneous emission (ASE) noise.

16. The system of claim 13, wherein the input and output couplers are dichroic couplers.

17. The system of claim 13, wherein the control signal inputted into the second detector is substantially residual pump energy which originated from the optical pump energy source and was separated from the combined signals.

18. The system of claim 12, further comprising:
   (f) a variable attenuator circuit, wherein the signals outputted by the first and second detectors are used by the variable attenuator circuit to control the amplitude of the control signal.

19. The system of claim 18, wherein the variable attenuator circuit comprises an electronically controlled optical attenuator optically coupled to an output of the optical pump energy source through which the control signal is outputted.

20. The system of claim 19, further comprising:
   (g) an amplifying element controlled by the control signal, wherein a feedback signal, derived from the signals outputted by the first and second detectors, is transmitted to the optical attenuator to adjust the amplitude of the control signal received by the amplifying element.

21. The system of claim 12, wherein the communication signal has a first wavelength and the control signal has a second wavelength.

22. The system of claim 21, wherein the first wavelength is about 1550 nm and the second wavelength is about 980 nm.

23. The system of claim 12, wherein a feedback signal, derived from the signals outputted by the first and second detectors, is transmitted to the optical pump energy source to control a drive current that determines the output energy level of the control signal.

24. The system of claim 12, wherein the first detector is one of a positive-intrinsic-negative (PIN) photodiode and an avalanche photodiode (ADP).

25. The system of claim 12, wherein the second detector is a photodiode.

26. The system of claim 12, wherein the optical pump energy source is a pump laser source.

27. The system of claim 12, wherein the system is an erbium doped fiber amplifier (EDFA) system.

* * * * *